United States Patent [19]

Lemmer

[11] Patent Number: 4,719,542
[45] Date of Patent: Jan. 12, 1988

[54] QUICK-MOUNT DEVICE FOR CONTACTORS

[75] Inventor: Helmut Lemmer, Marienheide-Kalsbach, Fed. Rep. of Germany

[73] Assignee: Square D Starkstrom GmbH, Fed. Rep. of Germany

[21] Appl. No.: 821,442

[22] Filed: Jan. 22, 1986

[30] Foreign Application Priority Data

Feb. 1, 1985 [EP] European Pat. Off. ......... 85101091.8

[51] Int. Cl.$^4$ .............................................. H05K 7/02
[52] U.S. Cl. ................................. 361/417; 248/221.4; 335/132; 361/419
[58] Field of Search ................. 248/73, 221.4, 222.1, 248/222.2, 223.3; 335/131, 132; 361/346, 356, 363, 376, 417–420, 427

[56] References Cited

U.S. PATENT DOCUMENTS

| | | | |
|---|---|---|---|
| 2,829,317 | 4/1958 | Timmermans | 361/346 |
| 2,880,262 | 3/1959 | Bell et al. | 361/417 |
| 3,188,405 | 6/1965 | Scheib | 335/132 |
| 3,215,800 | 11/1965 | Harter et al. | 335/132 |
| 4,581,489 | 4/1986 | Nozick | 361/395 |

FOREIGN PATENT DOCUMENTS

| | | | |
|---|---|---|---|
| 0259220 | 1/1965 | Australia | 361/356 |
| 0080909 | 6/1983 | European Pat. Off. | |
| 1113516 | 9/1961 | Fed. Rep. of Germany | |
| 2241219 | 10/1973 | Fed. Rep. of Germany | |
| 2803115 | 7/1979 | Fed. Rep. of Germany | |
| 1523308 | 5/1968 | France | |

*Primary Examiner*—A. D. Pellinen
*Assistant Examiner*—Gregory D. Thompson
*Attorney, Agent, or Firm*—Diller, Ramik & Wight

[57] ABSTRACT

A quick-mount device for a contactor which includes a housing in which is mounted a coil assembly having a coil and electrical terminals carried by a base plate. Opposite walls of the contactor housing include legs each carrying oppositely directing tangs or projections. A first of the oppositely directed tangs engaging the lateral edges of the base plate and a second of the oppositely directed tangs engaging lateral edges of a support rail. The opposite directed tangs are so relatively positioned that a screwdriver can be inserted therebetween for manually freeing the second tangs from engagement thereof with the support rail, yet maintaining the engagement of the first tangs with the base plate of the coil assembly, thereby permitting both quick-mounting and quick-demounting of the contactor relative to its associated coil assembly and/or support rail.

18 Claims, 6 Drawing Figures

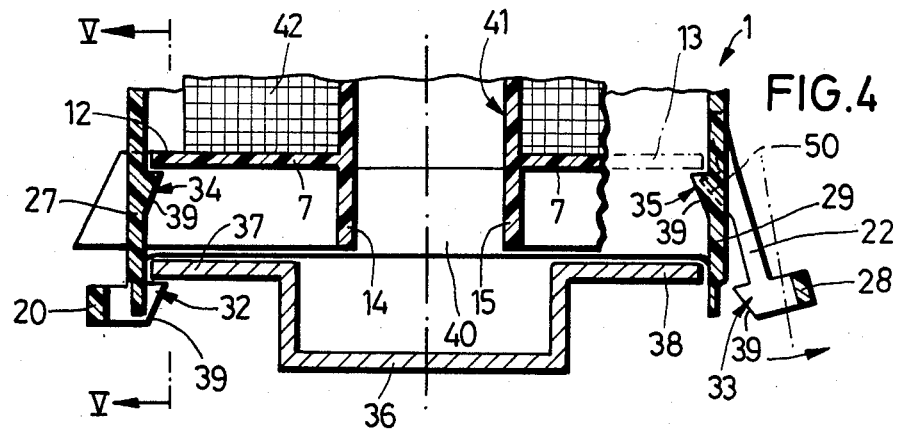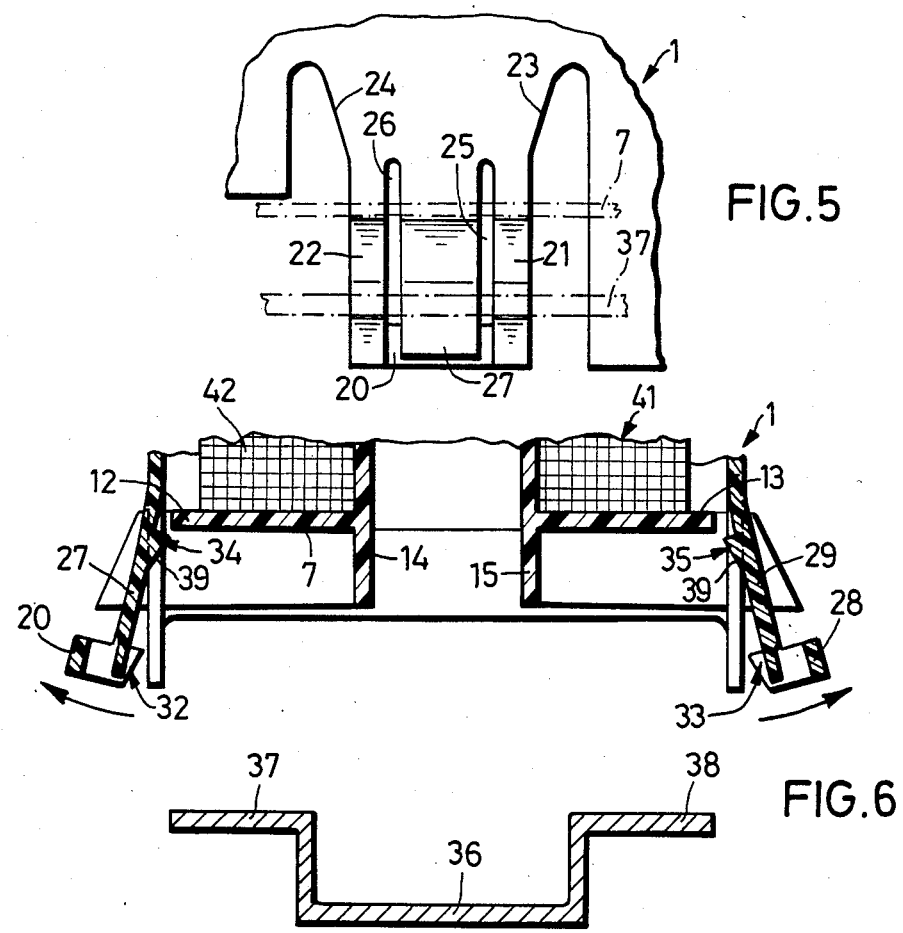

QUICK-MOUNT DEVICE FOR CONTACTORS

BACKGROUND OF THE INVENTION

The present invention is directed to a novel quick-mounted device for electrical contactors, particularly for minature contactors, which are normally mounted upon a support rail. Conventional contactors of this type include a coil and a core forming part of a magnetic system which are mounted on a base plate which is in turn housed within a housing or interior of the associated contactor.

Frequently contactors including housing having upper and lower parts with the upper part normally receiving a contact system which includes an internal movable armature of a magnetic system and externally accessible screws. The lower part of the housing normally receives a coil and a core of the magnetic system which are normally carried by a base plate. The base plate is bodily attached to and removable from the contactor housing. The base plate, coil and core are generally a single component which can be connected to the lower part of the conventional contactor housing. If, for example, a coil of a particular contactor is bad and must be replaced, the contactor is disassembled from its associated support rail, upon which a number of contactors are normally mounted close together or tightly one against the other, and in this manner a particular coil can be removed and/or replaced.

However, heretofore conventional quick-mounting of contactors has always required an additional mounting plate to which the base plate, coil and core was secured to fasten the latter assembled components to the lower side of the contactor housing. The additional mounting plate has special quick-mount devices, such as spring-loaded slides and opposing locking or abutment means. Normally, these removably engage opposite lateral edges of conventional support rails. However, when considering the large number of contactors that are normally required in a particular environment and the resulting mass-production therefor, such mounting plates and associated spring-loaded slides represent relatively high costs, both as to material and labor, particularly with respect to the production of minature contactors.

SUMMARY OF THE INVENTION

In view of the foregoing it is a primary object of the present invention to provide a novel quick-mounted device for contactors, particularly minature contactors, wherein such conventional latter-noted additional mounting plates are totally eliminated, yet nonetheless the structure of the invention assures quick assembly and disassembly of the contactors and their base plates, coils and cores, both during storage and shipping, but particularly during assembly and disassembly of the core assemblies relative to the contactor housing and the contactor housing relative to an associated support rail.

The novelty of the present invention lies in the provision of two different yet related securing means on opposite walls of the contactor housing, each of the securing means including inwardly directed tangs or projections, and the tangs or projections being such as to engage opposite lateral edges of the coil assembly base plate on the one hand and opposite lateral edges of the support rail on the other, yet upon the insertion of a tool between these securing means, the base plate and associated coil assembly is maintained securely mounted within the contactor housing while the contactor housing can be quickly unlocked and removed from (or applied to) an associated support rail.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 4 is a fragmentary cross-sectional view taken normal to the longitudinal axis of a support rail upon which the contactor is mounted, and illustrates opposite walls of the contactor housing, the flexible legs thereof, and opposing tangs or projections carried by the legs for securing the coil assembly within the contactor housing and the contactor housing to the support rail.

FIG. 5 is a cross-sectional view taken generally along line V—V of FIG. 4, and illustrates with more particularity the relationship of the flexible legs, the tangs or projections thereof and edges of the coil assembly, specifically the base plate thereof, and lateral edges of the support rail.

FIG. 6 is a cross-sectional view similar to FIG. 4, and illustrates the manner in which the flexible legs at opposite walls of the connector housing are moved away from each other to remove the contactor from a support rail and the coil assembly from the interior of the contactor housing.

DESCRIPTION OF THE PREFERRED EMBODIMENTS

Figures 1, 2:
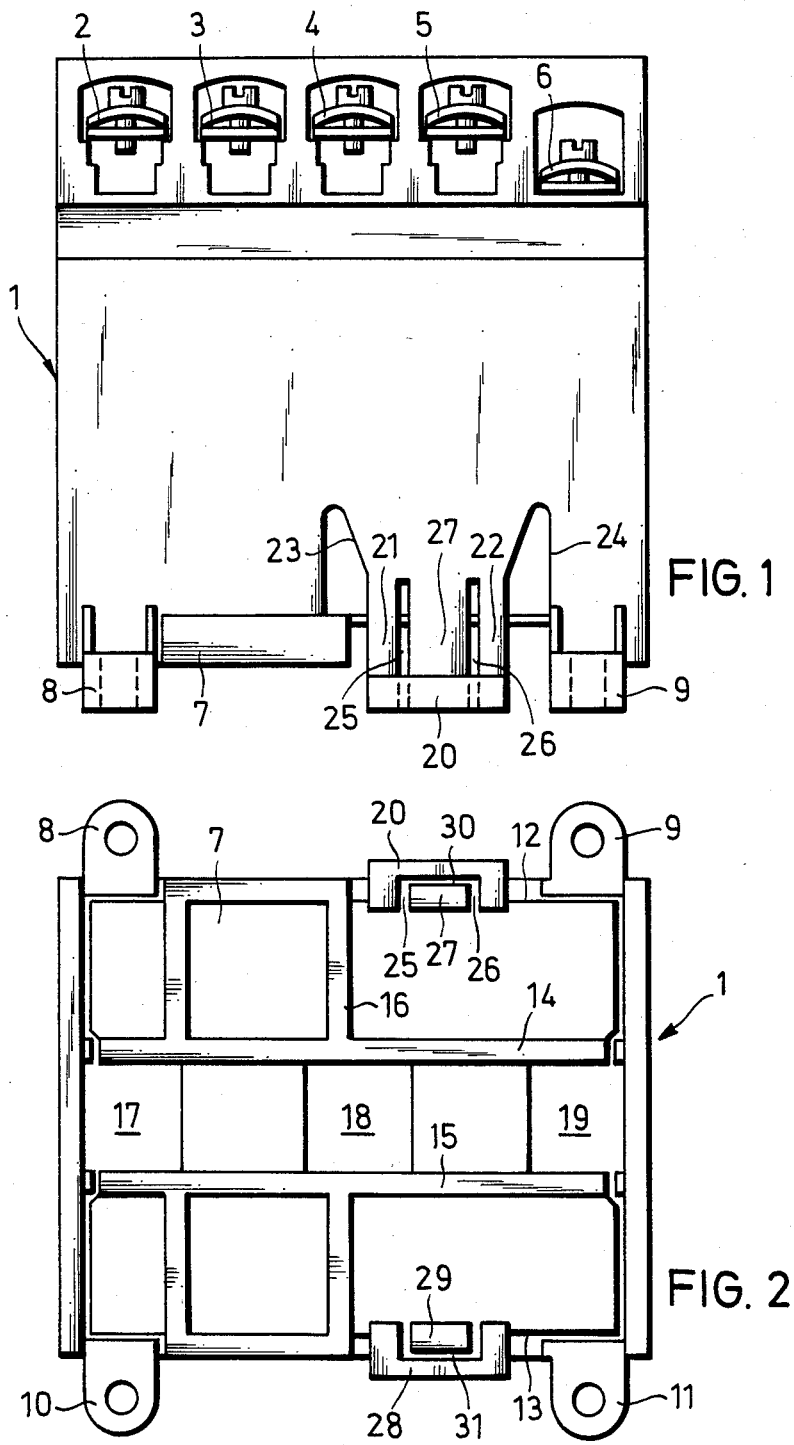
FIG. 1 is a side elevational view of a novel contactor constructed in accordance with this invention, and illustrates the housing having resilient depending legs for quick-coupling a coil assembly within the housing and quick-coupling the housing to an associated support rail.
FIG. 2 is a bottom plan view of the contactor of FIG. 1, and illustrates the manner in which the flexible legs are carried by opposite lateral walls of the housing.

A novel contactor constructed in accordance with this invention is shown in the various figures of the drawings and is generally designated by the reference numeral 1. The overall size of the contactor 1 can be standardized, particularly the width thereof so as to accommodate the contactor 1 upon associated standard or conventional support rails, such as a support rail 36 (FIGS. 4 and 6). However, while the contactor 1 is shown of a particular width, the invention also covers other contactors, particularly narrow contactors widthwise, which are approximately half as wide as that shown in FIG. 1.

Normally, the contactor 1 includes a contact system which is omitted from the drawing since it is conventional and is not part of the present invention. However, such a contact system normally includes at an upper part (unnumbered) of the contactor housing (also unnumbered) a number of electrical terminal clamps 2 through 5. Another terminal clamp 6 is located somewhat offset downward and is designed to be connected to an associated coil 42 (FIGS. 3, 4 and 6) of a coil assembly 41 which is fixed between a flange 43 and a base plate 7. The terminal clamp 6 and an opposite similar unnumbered terminal clamp (FIG. 3) are carried by electrical terminals 44, 45 of the flange 43.

Similar terminal clamps corresponding to the terminal clamps 2 through 6 are identically positioned on the side opposite of that shown in FIG. 1, and at both sides of the contactor housing, but in a top or cover 48 thereof (FIG. 3) bores 46, 47 are provided for permitting the introduction of a screwdriver to tighten or loosen th screws (unnumbered) of the terminal clamps 2 through 6 in a conventional manner.

A movable armature (not shown) of a magnetic system (also not shown) is operationally connected to the overall contact system, including the terminal clamps 2 through 6 within the contactor housing, and the contactor housing is closed at its lower side or lower part by the base plate 7 of the coil assembly 41 after the base plate 7 has, of course, been inserted through the bottom into the contactor housing, as is most apparent from FIGS. 4 and 6 of the drawings. If the coil 42 or the entire coil assembly 41 must be exchanged, the entire coil assembly 41 is pulled out through the bottom of the contactor housing, as is most apparent from FIGS. 4 and 6, and as will be described more fully hereinafter.

The housing of the contactor 1 also includes four outwardly projecting feet 8 through 11 which are an integral molded portion of the housing with each of the feet 8 through 11 being positioned at one of the housing corners. The feet 8 through 11 are provided with holes to allow the contactor 1 to be assembled in a conventional manner upon a mounting plate (not shown).

Securing means 20 through 22 and 28 on the one hand and 27, 29 on the other hand are provided at a lower part of the housing of the contactor 1 for securing the contactor housing to the support rail and retaining or securing the coil assembly 41 within the housing of the contactor 1, respectively. The securing means 20 through 22 and 28 includes a pair of resilient downwardly depending legs 21, 22 connected by a bright or arm 20, 28 with the legs 21, 22 and/or the arms 20, 28 each carrying at least one tang or projection 32, 33 in opposed relationship to each oher (FIG. 4) at opposite walls of the contactor housing. In other words, the legs 21, 22 and/or arm 20 at the left side of the contactor housing, as viewed in FIGS. 4 and 6, carrying tangs 32 which project toward tangs 33 carried by the legs 21, 22 and/or arm 28 of the right-side of the contactor housing, again as viewed in FIGS. 4 and 6. A leg 27 is between and spaced from the legs 21, 22 (FIG. 1) by slots 25, 26 and from the arm 20 by a slot or gap 30 (FIG. 2), while a leg 29 (FIG. 2) is similarly spaced from the legs 21, 22 by the slots 25, 26 and from the arm 28 (FIG. 2) by a slot or gap 31. The legs 27, 29 carry tangs or projections 34, 35, respectively (FIGS. 4 and 6), which project toward each other and are above the tangs or projections 32, 33 of the legs 21, 22. As is best illustrated in FIG. 4, the base plate 7 of the coil assembly 41 includes opposite lateral edges 12, 13, and these are engaged by the projections 34, 35. Similarly, the support rail 36 includes opposite generally parallel lateral edges 37, 38 (FIG. 4), and these are engaged by the projections 32, 33.

Figure 3:
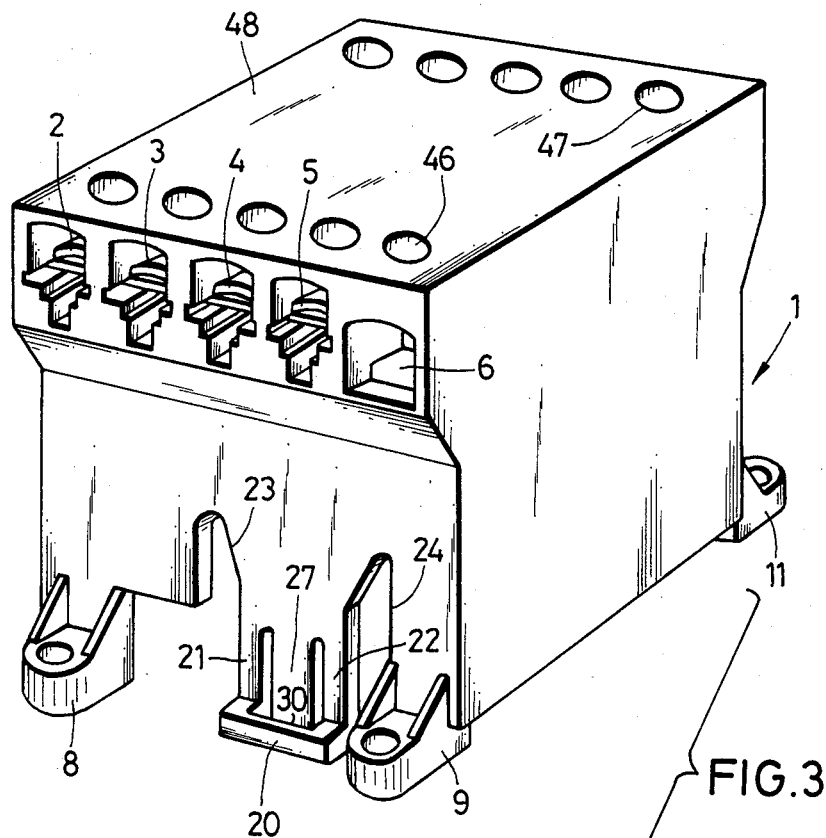
FIG. 3 is an exploded view of the contactor with a coil assembly shown removed from the contactor housing, and illustrates with more particularity the construction of the coil assembly and the flexible legs of one of the housing walls.
Figure 3:
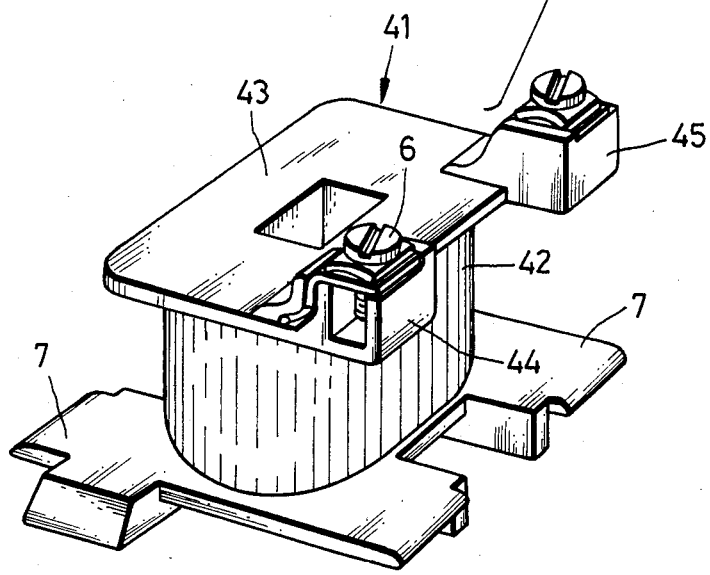

As is also best illustrated in FIGS. 1 and 3, the walls outboard of the legs 21, 22 are relieved or slotted at 23, 24. This basically imparts additional resilience to the legs 21, 22, 27, 29. When the coil assembly 41 is housed within the housing of the contactor 1, as shown in FIG. 4, the projections 34, 35 engage the edges 12, 13 of the base plate 7 and preclude the inadvertent removal of the coil assembly 41. Likewise, when the projections 32, 33 engage beneath the lateral edges 37, 38 of the support rail 36, the housing of the contactor 1 can not be inadvertently removed from the support rail 36. However, if for some reason the coil assembly 41 or the coil 42 must be removed from the housing of the contactor 1, a tool, such as the blade of a screwdriver, is simply inserted into either of the slots or gaps 30, 31 and rotated. This is illustrated schematically at the right-side of FIG. 4 where upon such rotation of the screwdriver blade causes outward bending or deflection of the legs 21, 22, thus releasing the projection or tang 33 from beneath the longitudinal edge 38 of the support rail 36. However, it is to be noted that this same rotation of the screwdriver blade will not move the leg 29 outwardly and, thus the edges 12, 13 will be held secure within the housing of the contactor 1 by the respective projections 34, 35. Once, of course, the right-side legs 21, 22 are deflected as shown at the right in FIG. 4, the entire contactor 1 can be removed from he support rail 36. Just as obviously, a screwdriver can be simultaneously inserted into both gaps 30, 31, simultaneously or alternately rotated, and both projections 32, 33 can be moved to the unlocked position to thus free the contactor 1 from the support rail 36. Once the contactor 1 has been removed from the support rail 36, the legs 27, 29 can be manually bent away from each other so that the projections 34, 35 will no longer underlie the edges 12, 13 of the coil assembly 41, and at this point (FIG. 6) the entire coil assembly 41, including the flange 43, the coil 42 and the base plate 7 can be removed from the housing of the contactor 1 (FIG. 6). Either an entire new coil assembly can then be reinserted into the contactor housing 1, or replacement parts can be assembled, as need be, upon the base plate 7 and the latter reinserted into the contactor housing.

The contactor housing and, of course, the walls of the legs 21, 22, 27 and 29 are constructed from resilient plastic material such that upon being deflected (FIG. 4, right-side; FIG. 6, both sides) and released, the legs will rebound to their normal unstressed condition (FIGS. 1, 3 and the left-hand side of FIG. 4). In this condition, assuming that the contactor housing lower part is empty, the repaired or new coil assembly can be simply inserted into the housing of the contactor 1 from the bottom at which point the edges 12, 13 of the base plate 7 simply ride along the tapered lower surfaces 39 of the projections 34, 35, causing the legs 27 an/or 29 to temporarily deflect outwardly until the edges 12, 13 pass the projections 34, 35 after which the inherent resilience of the legs 27, 29 bring the same once again to the nondeflected position thereof shown in FIG. 4 retaining the coil assembly 41 within the lower housing part of the contactor 1. The contactor 1 can then be reassembled to the support rail 36 simply by a downward pressure which forces lower tapered surfaces 39 of the projections 32, 33 against the lateral, longitudinal edges 37, 38 of the support rail 36, causing the legs 21, 22 to deflect outwardly (FIG. 6), after which the longitudinal edges 37, 38 past the projections 32, 33 and the legs 20, 21 again snap to the locked position (left-hand side of FIG. 4).

If desired, the legs 21, 22 can also be provided with one or more projections 50 corresponding to the projections 34, 35, as shown in FIG. 4. In this case the projections 50 of the legs 21, 22 functions to additionally secure the edges 12, 13 of the coil assembly 41 within the contactor housing. Hence, in this case the coil assembly 41 and its associated base plate 7 can not be removed from the contactor housing, unless the projections 34, 35 and the projections 50 are deflected out of engagement with the respective edges 12, 13 of the base plate 7. This provision of the projections 50 associated with the legs 21, 22 provides double assurance that even upon inadvertently releasing the projections 34, 35, the projections 50 will prevent the edges 12, 13 from dropping below the projections 50 to thus preclude inadvertent disassembly of the coil assembly 41 from the interior of the contactor housing.

In accordance with the present invention the projections 34, 35 and 50 need not be provided since a lower side of the base plate 7 can have longitudinal transverse reinforcing rims 14, 15 and 16 (FIG. 2) which can rest on the top surface (unnumbered) for the support rail 36, as is shown in FIG. 4. In this position, the projections 32, 33 hold the contactor housing locked to the lateral or longitudinal edges 37, 38 of the support rail which in turn retains the coil assembly 41 within the contactor housing.

If desired, the base plate 7 may include three rectangular holes 17, 18 and 19 if it is desired to pass a core 40 of the magnetic system, together with its three legs (not shown) through the base plate 7. At this point a core part (not shown) is positioned parallel to the base plate 7 and is mounted between the reinforcing ribs 14 and 15. To facilitate such mounting, all of the projections 34, 35, 50, etc. are preferably provided with surfaces corresponding to the tapered surface 39 of the projection 32.

It is also to be particularly noted relative to the attaching and detaching of the projections 32, 33 that the rotation of the screwdriver blade heretofore noted not only deflects the legs 21, 22 outwardly, but a force is created which forces the legs 27, 29 inwardly. This inward motion brings the projections 34, 35 further beneath the edges 12, 13 of the coil assembly 41 and its associated base plate 7, thus assuring that during detachment of the contactor 1 from the support rail 36, the coil assembly 41 will not be accidentally disassembled from the contactor housing interior. Thus, the coil assembly and its associated magnetic system can not accidentally drop out of the contactor housing and be otherwise inadvertently damaged. However, simply by the outwardly deflection of the legs 27, 29 (FIG. 6), the coil assembly 41 can be assuredly and positively removed from the contactor housing interior. Thus, the quick-mount device of the invention lends itself to rapid assembly and disassembly.

I claim:

1. A quick-mount device comprising a housing having opposite first and second side walls relatively spaced from each other, a separable component removably housed within said housing, a support rail, first means securing said separable component to each of said side walls, second means securing said support rail to each of said side walls, said first securing means being defined by first and second securing members positioned in opposing relationship to each other and being carried by said first and second side walls; said second securing means being defined by third and fourth securing members positioned in opposing relationship to each other and being carried by said first and second side walls; and means effecting relative movement of said third and fourth securing members away from each other in the absence of like movement of said first and second securing members away from each other whereby said housing can be removed from said support rail while said separable component is retained housed therein by said first and second securing members.

2. The quick-mount device as defined in claim 1 wherein said first through fourth securing members are each a tang.

3. The quick-mount device as defined in claim 1 wherein at least one of said first and second securing members is a tang.

4. The quick-mount device as defined in claim 1 wherein at least one of said third and fourth securing members is a tang.

5. The quick-mount device as defined in claim 1 wherein at least one of said first and second securing members is a tang, and at least one of said third and fourth securing members is a tang.

6. The quick-mount device as defined in claim 1 wherein at least one of said first and second securing members is a tang, at least one of said third and fourth securing members is a tang, and said tangs are directed toward an interior of said housing.

7. The quick-mount device as defined in claim 1 wherein said first and second side walls each include respective first and second relatively resilient legs disposed in adjacent spaced relationship, said first and second securing members being carried by said first legs, and said third and fourth securing members being carried by said second legs.

8. The quick-mount device as defined in claim 1 wherein said first and second securing members are in spaced relationshio to said support rail, and said third and fourth securing members are contiguous to said support rails.

9. The quick-mount device as defined in claim 1 wherein said first and second side walls each include a pair of resilient legs spanned by a bight, and said third and fourth securing members are carried one each by one of each of said pair of legs.

10. The quick-mount device as defined in claim 1 wherein said first and second side walls each include a pair of resilient legs spanned by a bight, said third and fourth securing members are carried one each by one of each of said pair of legs, another resilient leg of each side wall being positioned between each of said pair of legs, and said first and second securing members are carried one each by said another resilient legs.

11. The quick-mount device as defined in claim 1 wherein said movement effecting means is a relatively resilient leg of each side wall deflectable generally out of the normal plane of said each side wall and carrying one each of said third and fourth securing members.

12. The quick-mount device as defined in claim 7 wherein said first through fourth securing members are each a tang.

13. The quick-mount device as defined in claim 7 wherein at least one of said first and second securing members is a tang.

14. The quick-mount device as defined in claim 7 wherein at least one of said third and fourth securing members is a tang.

15. The quick-mount device as defined in claim 7 wherein at least one of said first and second securing members is a tang, and at least one of said third and fourth securing members is a tang.

16. The quick-mount device as defined in claim 9, wherein said third and fourth securing members are tangs directed toward an interior of said housing.

17. The quick-mount device as defined in claim 10 wherein said first and second securing members are tangs directed toward an interior of said housing.

18. The quick-mount device as defined in claim 1 wherein said separable component includes a base plate carrying a coil, said first securing means being operative to secure said base plate to said side walls during the removal of the housing from the support rail and being further operative to effect removal of the separable component from the housing after the housing has been removed from the support rail, said first and second securing members cooperatively secure said base plate to said first and second side walls during the removal of said housing from said support rail thereby retaining said base plate and coil in said housing, and thereafter said first and second securing members being manipulatable to separate said base plate from said first and second side walls.

* * * * *